United States Patent [19]

Iwaizako et al.

[11] Patent Number: 4,799,740
[45] Date of Patent: Jan. 24, 1989

[54] ELECTROPNEUMATIC MASTER CONTROLLER FOR AN AIR BRAKE SYSTEM

[75] Inventors: Akihiro Iwaizako; Hiroshi Nishii; Seiki Maruta, all of Kobe, Japan

[73] Assignee: Nippon Air Brake Co., Ltd., Kobe, Japan

[21] Appl. No.: 132,291

[22] Filed: Dec. 15, 1987

[30] Foreign Application Priority Data

Dec. 26, 1986 [JP] Japan .................. 61-314772

[51] Int. Cl.⁴ .............. B60T 13/70; B60T 13/68; B60T 15/14
[52] U.S. Cl. .......................... 303/15; 303/20; 303/3
[58] Field of Search .............. 303/3, 15, 16, 17, 20, 303/33, 59, 67, 72, DIG. 3, DIG. 4; 188/156, 159

[56] References Cited

U.S. PATENT DOCUMENTS

| 4,181,369 | 1/1980 | Balukin et al. | 303/16 |
| 4,344,138 | 8/1982 | Fraiser | 303/20 X |
| 4,685,750 | 8/1987 | Imanaka | 303/3 X |

FOREIGN PATENT DOCUMENTS 0018514  2/1979  Japan .................... 303/15

Primary Examiner—Andres Kashnikow
Assistant Examiner—Timothy Newholm
Attorney, Agent, or Firm—J. B. Sotak

[57] ABSTRACT

An electropneumatic master controller for an electromagnetic straight air brake system for railway vehicles has a brake valve, brake solenoid valve, a release solenoid valve, and an electrical interface circuit. The electrical interface circuit includes a first and a second sensor and a first and a second comparator which are responsive to the pressure of the control line and straight air line to open and close the brake and release solenoid valves for applying and releasing the brake cylinder.

10 Claims, 2 Drawing Sheets

ELECTROPNEUMATIC MASTER CONTROLLER FOR AN AIR BRAKE SYSTEM

FIELD OF THE INVENTION

This invention relates to an electropneumatic master controller for an electromagnetic straight air brake system for railway vehicles in which a failure will not result in motor burn-out or in unnecessary compressor operation.

BACKGROUND OF THE INVENTION

In previous air brake system, it was common practice to employ apparatus as illustrated and described in FIG. 1 of Japanese Patent (Tokuko) No. 45-6082 and in FIG. 1 of Japanese Patent (Tokukai) No. 59-50850. A example of such prior art systems is illustrated in FIG. 3 of the present application in which the following is a detailed description of the components and operation thereof. It will be seen that FIG. 3 shows a system in which the brake valve BV is in the release position and the brake cylinder BC is exhausted. In the release position, the control line CP is exhausted by the brake valve BV so that the pressure is at atmosphere. Under such a condition, the electropneumatic master controller 100 moves the rod 102 to the left due to the added force of the return spring 101. Thus, the release contact 103 switches to a closed position while at the same time the contact 104 switches to an open position. When the release contact 103 is closed, the release command line RS is connected to the power source line and the release solenoid valve RMV is energized and is opened so that the straight air line SAP is exhausted to atmospheric pressure. In addition, since the braking contact 104 is opened, the brake command line BS is disconnected from the power source line, and the brake solenoid valve BMV is deenergized and is closed. Thus, the straight air line SAP is not connected to the main air reservoir line MRP. Therefore, the relay valve RV closes the air supply, and at the same time the intermediate exhaust valve rod moves downward so that the brake cylinder BC is exhausted to atmosphere. In viewing FIG. 3, it will be seen that the check valve CV1 is arranged in such a manner that the blocking direction is from the straight air line SAP. It will be noted that the throttle valve NV is connected in parallel to the check valve CV1. The air reservoir AR which supplies the air to the brake cylinder BC through the relay valve RV and the check valve CV2 in which the free flow direction is toward the air reservoir AR. The output or the exhaust outlet EX relay valve RV is connected to atmosphere.

Let us assume that the brake system is in the released state, as is illustrated in FIG. 3, and that it is desired to move the handle of the brake valve BV into an appropriate braking position. Thus, the control line CP will be pressurized a given amount which is dictated by the selected brake position so that the rod 102 is urged toward the right against the force of the return spring 101, as viewed in FIG. 3. This causes the release contact 103 to open so that the releasing solenoid valve RMV is deenergized and the exhaust port EX is closed. Accordingly, the straight air line SAP is disconnected from the atmosphere. Now as the rod 102 moves further to the right, it causes the compression of the buffer spring 105, and in turn causes the closing of the braking contact 104. Therefore, the brake solenoid valve BMV is energized so that it becomes open and the compressed air pressure in the main air reservoir line MRP is conveyed to the straight air line SAP. The exhaust valve rod of relay valve RV moves upward to unseat and open the air supply valve. Thus, the compressed air pressure in the air reservoir AR is fed into the brake cylinder BC so that a brake force is applied to the wheel of the railway car. In addition, when the rod 102 of controller 110 is pushed back slightly to the left due to the pressure in the straight air line SAP and the pushing forces of the two sides, an equilibrium is reached on the right and left sides of the rod 102. Thus, the braking contact 104 will be opened so that the brake soleoid valve BMV is deenergized and its valve is reseated. Thus, the straight air line SAP is no longer pressurized by the main pressure reservoir line MRP. At this time, the release contact 103 also remains opened. Therefore, the straight air pipe or line SAP is neither pressurized nor exhausted so that the system is in a lapped condition.

In this lapped condition, if the brake valve BV is moved to a lesser or lower notch, or position of braking, the control line CP will be exhausted to a certain degree depending on the particular selected brake position. Thus, the rod 102 will move to the left and the release contact 103 will close. This causes the release solenoid valve RMV to be energized which results in the unseating and opening of the air portion of the valve. Since the straight air line SAP is exhausted, the rod 102 will again move to the right and the release contact 103 will open. Thus, the opening of release contact 103 causes the deenergization and closing of release solenoid valve RMV. Thus, the exhausting of the straight air line SAP is stopped and the system assumes the same lapped condition as described above. At the same time, as a result of the movement of the relay valve RV, the brake cylinder BC is also exhausted to a certain degree, depending on the above-mentioned brake position. After this, when the brake valve BV is moved into the release position, each of the structural parts are again returned to the release position, as shown in FIG. 3.

It will be appreciated that there are various types of electropneumatic master controllers in operations of the prior art besides the system shown and disclosed in the present application. However, they are all basically the same.

The electropneumatic master controllers are generally designed so that the pressure to the straight air line SAP is introduced via the throttle valve NV to protect it from transient effects during the pressurization. Thus, any water vapor contained in the compressed air condenses due to adiabatic expansion at the throttle valve NV during its introduction. Therefore, the inside of the diaphragm plate chamber can sometimes become frozen in winter, thereby causing defective operation and/or complete failure. Although FIG. 3 is drawn simply for purposes of explanation, a great many electropneumatic master controllers of the prior art are almost entirely composed of mechanical components which results in a highly complicated mechanical design so that it is necessary to make great many checks and adjustments in order to achieve troubleless operation.

OBJECTS OF THE INVENTION

Therefore, it is an object of this invention to provide an improved electropneumatic master controller which is mainly composed of electrical components.

A further object of this invention is to provide a new and improved electropneumatic master controller which is not susceptible to freeze-up during cold weather.

Another object of this invention is to provide a unique electropneumatic master controller employing electronic circuitry for controlling brake solenoid and release solenoid valves in a straight air brake system for railway vehicles.

Yet a further object of this invention is to provide an electropneumatic master controller comprising, a first sensor for converting the air pressure in a control line which is pressurized during a braking operation of the brake valve and which is discharged during a releasing operation of the brake valve into an electric signal equivalent to the value of the pressure, a second sensor for converting the air pressure in the straight air line which is pressurized by closing a solenoid valve for releasing and by opening the solenoid valve for braking and which is discharged by closing the solenoid valve for braking and by opening the solenoid valve for releasing, and the brake cylinder is operated by this increased or decreased pressure, into an electric signal equivalent to its pressure, a delay circuit which provides an output signal to the second sensor and which provides the output signal to the straight air line. A first comparator compares the variation straight air of a signal from the control line signal based on the output signal of the first sensor with a first set point which opens the releasing solenoid valve when the variation is less than the first set point and which closes the releasing solenoid valve when the variation is larger than the first set point, and the second comparator which compares the variation with a second set point which is larger than the first set point and which closes the braking solenoid valve when the variation is less that the second set point and which opens the braking solenoid valve when the variation is larger than the second set point.

SUMMARY OF THE INVENTION

In accordance with the present invention, there is provided an electropneumatic master controller having electrical circuitry including a first sensor which may take the form of a pressure-sensitive strain gauge. The first strain gauge senses the air pressure in the control line which is pressurized by the brake application operation of the brake valve and which is exhausted by the brake release operation of the brake valve and converts the pressure into a proportional electric signal. A second sensor which also may take the form of a pressure-sensitive strain gauge senses the air pressure in the straight air line. The straight air line is pressurized by closing the solenoid release valve and by opening the solenoid brake valve. The straight air line is exhausted by closing the solenoid brake valve and by opening the solenoid release valve. The brake cylinder is operated by increasing or decreasing the air in the control line pressure, and the pressure is converted into a proportional electric signal. A delay circuit receives an input signal from the second sensor and provides an output signal proportional to the straight air line signal. A first comparator compares the difference of the signals between straight air line of the delay circuit signal and the control line signal produced by the first senseor with a first set point. The solenoid release valve is opened when the difference is less than the first set point, and the solenoid release valve is closed when the difference is larger than the first set point. A second comparator compares the difference with the second set point which is larger than the first set point. The solenoid brake valve is closed when the difference is less than the second set point, and the solenoid brake valve is open when the difference is larger than the second set point.

Now when the brake valve BV is in the release position, the control line CP is exhausted to atmospheric pressure so that the electrical output signal of the first sensor, namely, the control line signal at a zero (0) level. The difference from which the straight air signal is substracted from this control line signal is less than the first set point, the first comparator opens the solenoid release valve RMV and at the same time the second comparator closes the solenoid brake valve BMV. When the straight air line SAP is in the state in which the pressure is reduced to the atmospheric level, the straight air signal is at a zero (0) level. Now when the brake valve BV is operated into the brake position, the control line CP is pressurized. Thus, the output signal of the first sensor S1 will rise according to the control line signal, and since the output signal of the second sensor S2, namely, the straight air line signal is at a zero (0) level at this time, the difference increases and eventually reaches the first set point. Thus, the first comparator CO1 closes the solenoid release valve RMV so that the straight air line SAP is disconnected from the atmosphere. When the difference reaches the second set point, the second comparator CO2 opens the solenoid brake valve BMV. Thus, the straight air line SAP is pressurized and causes the brake cylinder BC to initiate a braking condition. When the straight air line SAP is pressurized, the output of the second sensor, namely, the straight air line signal will increase from the zero (0) signal level. Thus, the differential signal from the control line signal which is dependent upon the selected brake position decreases. Now when the differential signal becomes less than the second set point, the second comparator CO2 closes the soleniod brake valve BMV so that further pressurization of the straight air line SAP is prevented. At this time, the solenoid release valve RMV is still closed so that the braking system assumes an overlapped condition for maintaining the selected braking.

In this overlapped condition, if the brake valve BV is moved to a lower or reduced brake position, the control line or pipe CP will be exhausted to a pressure level corresponding to the newly selected brake position. Thus, the output signal of the first sensor, namely, the control line signal will also decrease. The differential signal eventually correspondingly decreases and eventually becomes less that the first set point. Thus, the first comparator opens the solenoid release valve RMV, and the straight air line SAP will begin to exhaust. At this time, the solenoid brake valve BMV is still closed. Due to the exhausting of the straight air line SAP, the output signal of the second sensor 2, namely, the straight air line signal E2 will decrease. The differential signal from the above will increase. Now when the differential signal becomes larger than the first set point, the first comparator closes the solenoid release valve RMV so that the exhausting of the straight air line SAP ceases. Since the brake solenoid valve BMV is closed at this time, the system again assumes an overlapped condition. In the overlapped condition, the given amount of braking continues until the brake valve BV is moved to a lower position or to the full release position. In the present invention, the function of the delayed circuit is substantially equivalent to the throttle valve NV as illustrated in FIG. 3. Accordingly, transitional effects occurring during the pressure change in the straight air line SAP are readily handled and quickly eliminated electrically. Thus, the second sensor S2 which receives the pressure from the straight line SAP converts it to an electrical signal. Thus, the throttle valve NV is eliminated in the area which introduces the pressure from the straight air line SAP. Therefore, there is no adiabatic expansion of the compressed air in the introduction area, so that the formation of drainage of the water vapor in the compressed air is prevented.

DESCRIPTION OF THE DRAWINGS

The above objects and other attendant features and advantages will be more readily appreciated as the present invention becomes better understood by reference to the following detailed description when considered in conjunction with the accompanying drawings, wherein.

DETAILED DESCRIPTION OF THE INVENTION

Figure 1:
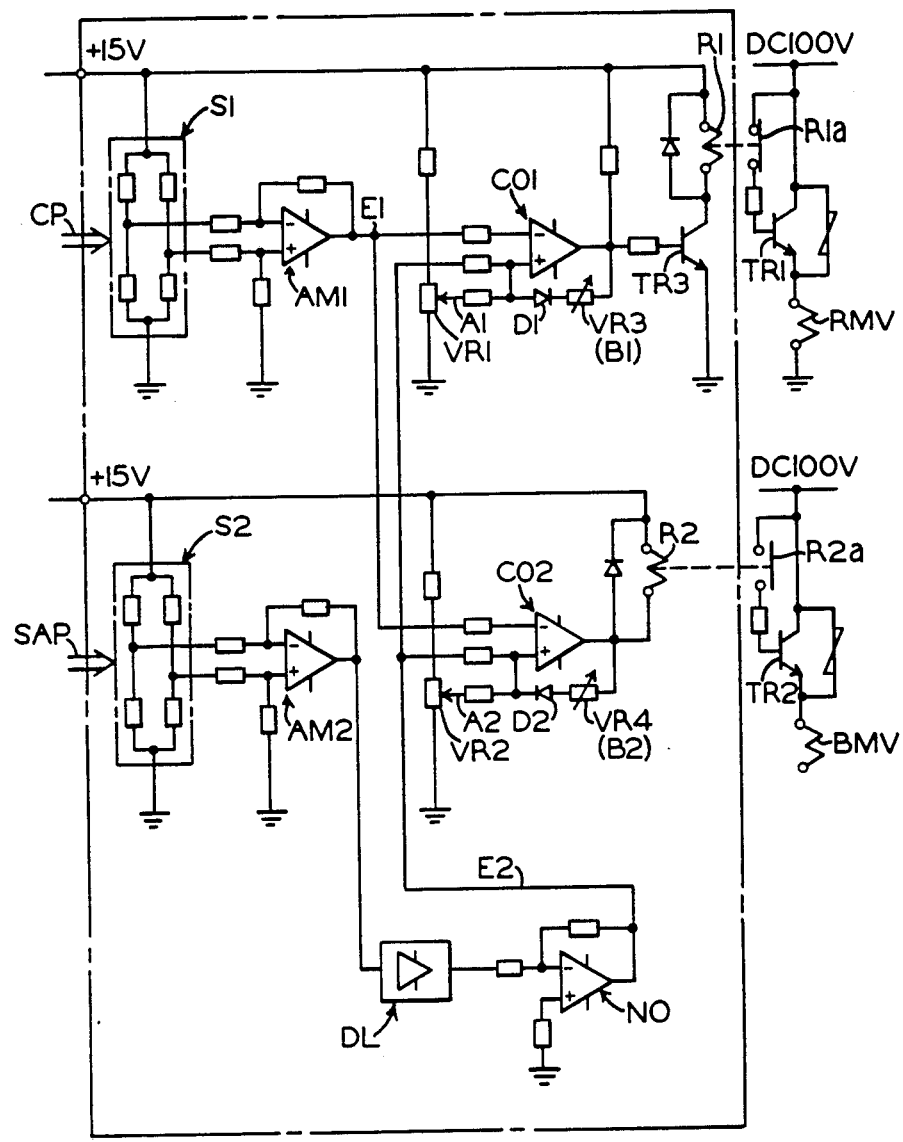
FIG. 1 is a schematic circuit diagram of an embodiment of the electronic type of straight air master controller for a electropneumatic air brake system for the vehicles of a railway train.
Figure 3:
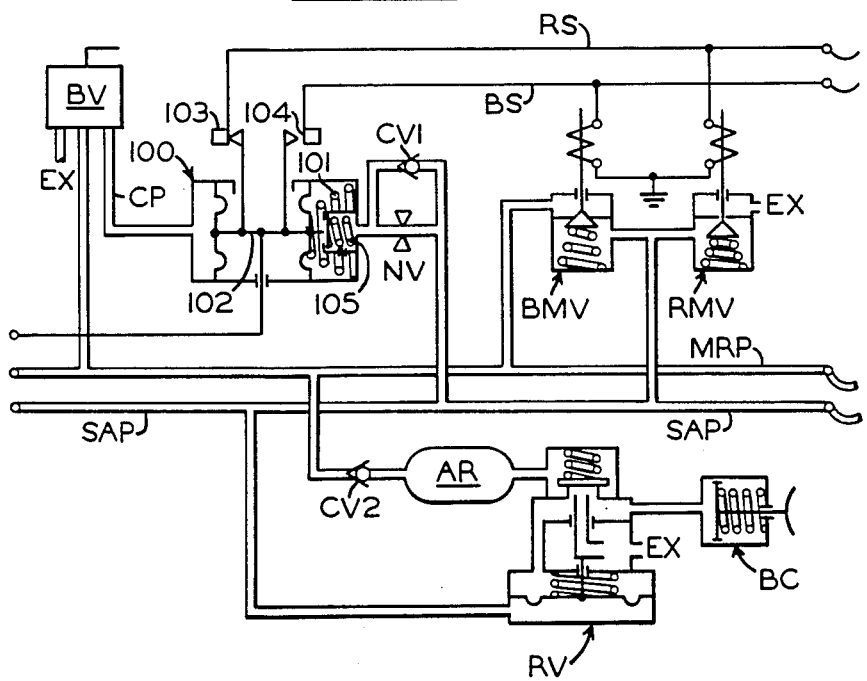
FIG. 3 is a mechanical version of an electropneumatic straight air controller of the prior art.

Referring now to the drawings, and in particular to FIG. 1, there is shown a preferred embodiment of an electronic version of an electropneumatic straight air controller for use in an air brake system for railway vehicles. In viewing FIG. 1, it will be seen that the electropneumatic master controller primarily includes a first strain gauge sensor S1, a second strain gauge sensor S2, a time delay circuit DL, a first comparator circuit CO1, and a second comparator circuit CO2. The first sensor S1 takes the form of a brake network which includes at least one pressure sensing strain gauge element, not specifically characterized in FIG. 1, for sensing the pressure in the pressure control line of the brake valve. The first sensor converts the air pressure in a corresponding output voltage or first electrical signal. This output voltage signal is amplified by amplifying circuit AM1 to produce a control line signal E1. The second sensor S2 also takes the form of a bridge network which includes at least one pressure sensing strain gauge element, not specifically characterized in FIG. 1, for sensing the pressure in the straight air line SAP. The second sensor converts the air pressure into a corresponding output voltage or second electrical signal. This output signal is amplified by a second differential amplifier AM2 to the control level of the later step. This amplified output is fed to the time delay circuit DL which has a function similar to the throttle valve NV and the check valve CV1 of FIG. 3. After a certain time delay, the delay circuit DL passes an output signal which is proportional to the pressure in the straight air line to an inverter NO which changes the sign of the incoming signal and produces an output signal E2. The first comparator CO1 compares the sum of the straight air line output signal E2 and a first set point A1 with the control line signal E1. In other words, the comparator CO1 subtracts the straight air line signal E2 from the control line signal E1 and then compares this differential signal (E1−E2) with the first set point A1. It will be appreciated that the first set point A1 is controlled by the variable resistor VR1. This first set point A1 is functionally equivalent to the added force of the return spring 101 which is illustrated in FIG. 3.

A series circuit including the diode D1 and the variable resistor VR3 stabilizes the operation by producing a small amount of hysteresis B1, where B1<<A1. Under certain conditions, the induced hysteresis may be unnecessary. The output of the comparator circuit CO1 is connected to the input of output transistor TR3. The NPN transistor TR3 controls the conductive condition of a first output relay R1. That is, the base electrode of transistor TR3 is connected to the output while the first comparator CO1 collector electrode is connected to the winding of relay R1.

The second comparator CO2 compares the sum of the straight air line signal E2 and the second set point A2 with the control line signal E1. In other words, it compares the differential signal (E1−E2) with the second set point, A2 which is set to be larger than the first set point A1 by adjusting the variable resistor VR2. This difference between the two set points (A2−A1) is substantially equivalent to the added biasing force of the buffer spring 105 as illustrated in FIG. 3.

The interchangeability of the two set points A2 and A1 was considered to be an important factor over the controller 100 of the prior art. Therefore, if it is desired, the second set point A2 can be the same as the first set point A1. In addition, the series circuit of the diode D2, and the variable resistor VR4 produces a small hysteresis B2 where B2>>A2 to stabilize the operation. In some cases, B2 can be equal to B1, and in some instances, the hysteresis can be eliminated altogether. It will be noted that there is a second output relay R2 connected to the output of the second comparator CO2. It will be understood that the release solenoid valve RMV and/or the brake solenoid valve BMV may be opened and closed in response to the release command and the brake command signal produced by the electropneumatic master controller of FIG. 1.

The release solenoid valve RMV is connected in series with the first power transistor TR1 which is switched ON and OFF by the closing and the opening of the normally-opened contact R1a of the first output relay R1. This NPN transistor TR1 is functionally equivalent to the release contact 103 illustrated in FIG. 3. The brake solenoid valve BMV is connected in series to the second power transistor TR2 which is switched ON and OFF by the closing and the opening of the normally-opened contact R2a of the second output relay R2. This NPN transistor TR2 is functionally equivalent to the brake contact 104 illustrated in FIG. 3. As shown, the sensors, amplifiers, inverter, comparators, output amplifiers, and relays are powered by a +15 v voltage source while the brake and release valve are powered by a DC 100v voltage source.

Figure 2:
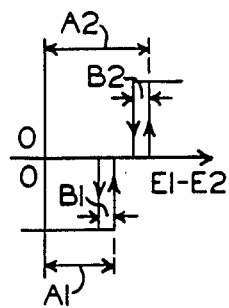
FIG. 2 is a graphical illustration of the operation of the embodiment shown in FIG. 1.

The functional operation of the preferred embodiment of the subject invention which is illustrated in FIG. 1 will be explained in conjunction with reference to FIG. 2.

When the brake valve BV is in the release position, the control line CP is at atmospheric pressure, and the control line signal E1 is at a 0 level. The differential signal (E1−E2) where the straight air line signal E2 is subtracted from this control line signal E1, is less than the first set point A1. Therefore, the first comparator CO1 turns the output transistor TR3 to an ON condition, and the first output relay R1 is energized. This causes the normally-open contact R1a to be closed.

Thus, the first power transistor TR1 turns ON and causes the release solenoid valve RMV to be energized. Thus, the valve RMV is opened to the exhaust port EX and the straight air line SAP is connected to the atmosphere. At this time, the second comparator CO2 is deenergized so that the second output relay R2 and the second power transistor TR2 are turned OFF. Thus, the normally-open contact R2a remains open, and the brake solenoid valve BMV remains deenergized. Thus, the valve BMV is pneumatically closed, and the straight air line SAP is cut off from the original air reservoir line MRP. Therefore, the straight air line signal E2 is at a 0 pressure level. Now when the brake valve BV is moved to the brake position, the control line CP will become pressurized so that the control line signal E1 increases. Thus, the differential signal (E1−E2) from the straight line signal E2 increases. When it reaches the first set point A1, the first comparator CO1 turns the output transistor TR3 OFF so that the first output relay R1 is deenergized. Thus, its normally-open contact R1a becomes open and the first power transistor TR1 is turned OFF. Accordingly, the release solenoid valve RMV is deenergized and its pneumatic valve is closed so that straight air line SAP is cut off from the atmosphere. At this time, the brake solenoid valve BMV is still closed. When the above-mentioned differential signal (E1−E2) increases further and reaches the second point A2, the second comparator CO2 energizes the second output relay R2. Thus, the relay R2 closes its normally-open contact R2a so that the second power transistor TR2 turns ON. Thus, the brake solenoid valve BMV is energized and the pneumatic valve is opened. Accordingly, air pressure is supplied from the main air reservoir line MRP into the straight air line SAP so that a brake application is initiated. In response to this pressurization of the straight air line SAP, the straight air control signal E2 increases and the differential signal (E1−E2) from the control line signal E1, which corresponds to the brake position, decreases. Now when the differential signal (E1−E2) becomes less than the difference between (A2−B2), the second comparator CO2 deenergizes the second output relay R2. In response to the opening of its normally-opened contact R2a, the second power transistor TR2 is turned OFF and the brake solenoid valve BMV is deenergized. Thus, the biasing spring returns the valve BMV to its closed position and the pressurization of the straight air line SAP is interrupted. At this time, the release solenoid valve RMV is also still closed and it assures the overlapped state which is a brake maintaining state. In this overlapped state, when the brake valve BV is released or operated to the lower braking position, the control line CP is exhausted until the pressure reaches a level which is equivalent to the newly operated brake position so that the control line signal E1 decreases and the differential signal (E1−E2) from the straight air line signal E2 decreases. When it becomes less than the difference between (A1−B1), the first comparator CO1 switches the output transistor TR# to an ON condition. Thus, the first output relay R1 is energized and its electrical contact R1a is closed so that the first power transistor TR1 is turned ON and the release solenoid valve RMV is energized and opens exhaust port to atmosphere. Thus, the straight air line SAP is exhausted to atmosphere, and at this time the brake solenoid valve BMV remains closed.

In response to this exhaustion of the straight air line SAP, the straight air line control signal E2 decreases while, at the same time, the control line signal E1 increases. Now when the differential signal (E1−E2) reaches the first set point A1, the first comparator CO1 turns the output transistor TR3 OFF. Thus, the first output relay R1 is deenergized and its normally-open contact R1a becomes opened so that the first power transistor TR1 is turned OFF. The turning OFF of transistor TR1 causes the release solenoid valve RMV to be deenergized. Thus, the exhaust port is closed, and the exhaustion of the straight air line SAP is interrupted. At this time, the brake solenoid valve BMV remains closed so that an overlapped condition results. In this overlapped condition, if the brake valve BV is moved to the release position, it will return to the release position. In addition, each movement of each structural part in the embodiment described above, in other words, ON, OFF, open and/or close, can be reversed as desired.

The operation of the invention of the embodiment described above is equal and/or superior to that of the mechanical type electropneumatic master controller of the prior art. Diagnostic testing and adjustments are simple to perform, since the equipment is mainly electrical in nature, and the function of the delay circuit is equivalent to the throttle valve of the prior art. Thus, the transistion effects which occur during the change in pressure of the straight air line can be easily processed and overcome by the electrical circuit. Thus, the throttle valve is not required in the second sensor which measures the air pressure of the straight air line. Therefore, the adiabatic expansion of the compressed air does not occur in the introductory portion of the pressurization of the straight air line. Therefore, the formation of drainage from the water vapor in the compressed air is prevented and operational failure due to freezing in winter is avoided.

The following is a nomenclature list of components or elements shown and disclosed in the drawings and specification of the subject invention:

S1—first sensor
S2—second sensor
E1—control line signal
E2—direct connecting line signal
CO1—first comparator
CO2—second comparator
A1—first set point
A2—second set point
DL—delay circuit
BV—brake valve
CP—control line
SAP—straight air line
RMV—solenoid release valve
BMV—solenoid brake valve Thus, the present invention has been described in such full, clear, concise and exact terms as to enable any person skilled in the art to which it pertains to make and use the same, and having set forth the best mode contemplated of carrying out this invention. We state that the subject matter, which we regard as being our invention, is particularly pointed out and distinctly asserted in what is claimed. It will be understood that variations, modifications, equivalents and substitutions for components of the above specifically-described embodiment of the invention may be made by those skilled in the art without departing from the spirit and scope of the invention as set forth in the appended claims.

We claim:

1. An electropneumatic master controller for a brake system of a railway vehicle comprising, a first sensor for converting the air pressure in a control line into a first equivalent electrical signal, the control line being pressurized by the braking operation of a brake valve and being exhausted by the releasing operation of the brake valve, a second sensor for converting the air pressure in a straight air line into a second equivalent electrical signal, the straight air line being pressurized by closing a release solenoid valve and by opening a brake solenoid valve and being exhausted by closing the brake solenoid valve and by opening the release solenoid valve, a delay circuit means receiving the second equivalent electrical signal from the second sensor and after a certain time delay producing an output representative of the second equivalent electrical signal, a first comparator means comparing the difference between the first equivalent electrical signal and the second equivalent electrical signal with a first set point for opening the release solenoid valve when the difference is less than the first set point and for closing the release solenoid valve when the difference is larger than the first set point, and a second comparator means comprising the difference with a second set point which is larger than the first set point for closing the brake solenoid valve when the difference is less than the second set point and for opening the brake solenoid valve when the difference is larger than the second set point.

2. The electropneumatic master controller as defined in claim 1, wherein the first sensor includes at least one strain gauge element.

3. The electropneumatic master controller as defined in claim 2, wherein the second sensor includes at least one strain gauge element.

4. The electropneumatic master controller as defined in claim 1, wherein the first sensor is a bridge network.

5. The electropneumatic master controller as defined in claim 1, wherein the second sensor is a bridge network.

6. The electropneumatic master controller as defined in claim 1, wherein a first differential amplifier is coupled between the first sensor and the first comparator means.

7. The electropneumatic master controller as defined in claim 6, wherein a second differential amplifier is coupled between the second sensor and the seocnd comparator means.

8. The electropneumatic master controller as defined in claim 1, wherein the first comparator means is coupled to an output transistor.

9. The electropneumatic master controller as defined in claim 8, wherein a first power transistor is coupled between the output transistor and the release solenoid valve.

10. The electropneumatic master controller as defined in claim 9, wherein a second power transistor is coupled between the second comparator means and brake solenoid valve.

* * * * *

UNITED STATES PATENT AND TRADEMARK OFFICE
CERTIFICATE OF CORRECTION

PATENT NO. : 4,799,740
DATED : January 24, 1989
INVENTOR(S) : Akihiro Iwaizako, Hiroshi Nishii, and Seiki Maruta It is certified that error appears in the above–identified patent and that said Letters Patent is hereby corrected as shown below:

Column 9, line 26, delete "comprising" and insert --comparing--

Column 10, line 18, delete "seocnd", second occurrence, and insert --second--

Signed and Sealed this

Fourth Day of July, 1989

Attest:

DONALD J. QUIGG

Attesting Officer

Commissioner of Patents and Trademarks